(12) United States Patent
Lehmann et al.

(10) Patent No.: US 10,642,318 B1
(45) Date of Patent: May 5, 2020

(54) PLANAR HINGE ASSEMBLY

(71) Applicant: Apple Inc., Cupertino, CA (US)

(72) Inventors: Alex J. Lehmann, Sunnyvale, CA (US); Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/355,118

(22) Filed: Mar. 15, 2019

Related U.S. Application Data

(60) Provisional application No. 62/731,254, filed on Sep. 14, 2018.

(51) Int. Cl.
*G06F 1/16* (2006.01)

(52) U.S. Cl.
CPC ............ *G06F 1/1681* (2013.01); *G06F 1/162* (2013.01); *G06F 1/1684* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,415,173 B2 * | 8/2008 | Kassamakov | .......... | G06F 1/1616 250/231.18 |
| 8,581,859 B2 * | 11/2013 | Okumura | .............. | G06F 1/1626 345/173 |
| 8,958,201 B2 * | 2/2015 | Leung | ................... | G06F 1/1626 361/679.27 |
| 8,976,141 B2 * | 3/2015 | Myers | ................. | H04M 1/0268 345/173 |
| 9,176,535 B2 * | 11/2015 | Bohn | ..................... | G06F 1/1641 |
| 9,348,362 B2 * | 5/2016 | Ko | .......... | G06F 1/1626 |
| 9,348,450 B1 * | 5/2016 | Kim | ...................... | G06F 1/1681 |
| 9,504,170 B2 * | 11/2016 | Rothkopf | ............ | H04M 1/0216 |
| 9,541,962 B2 * | 1/2017 | Siddiqui | ............... | G06F 1/1618 |
| 9,594,401 B2 * | 3/2017 | Liang | .................... | G06F 1/1618 |
| 9,664,210 B2 | 5/2017 | Ou et al. | | |
| 9,891,670 B2 * | 2/2018 | Kim | ...................... | G06F 1/1652 |
| 9,927,841 B2 * | 3/2018 | Gheorghiu | ............ | G06F 1/1652 |
| 9,930,152 B2 * | 3/2018 | Kim | ...................... | G06F 1/1652 |
| 9,952,627 B2 * | 4/2018 | Aurongzeb | .......... | G06F 1/1641 |
| 10,013,022 B1 * | 7/2018 | Aurongzeb | ........... | G06F 1/1616 |

(Continued)

*Primary Examiner* — Lisa Lea-Edmonds
(74) *Attorney, Agent, or Firm* — Dickinson Wright RLLP

(57) ABSTRACT

A personal computing device comprises a single piece body having a seamless overall appearance and that includes a bendable portion that is capable of having a smoothly curved shape. The single piece body includes a first part capable of carrying a display suitable for presenting visual content, and a second part that is capable of carrying an input device suitable for accepting an input action. The personal computing device also includes a multi-state bending assembly carried by the single piece body at the bendable portion and positioned between and in mechanical communication with the first part and the second part. The multi-state bending assembly includes a planar assembly that, in a first state, is characterized as having a first thickness and allows relative movement of the first and second parts with respect to each other. In a second state, the planar assembly is characterized as having a second thickness, less than the first thickness, that is capable of maintaining a fixed angular displacement between the first and second parts.

20 Claims, 9 Drawing Sheets

(56) References Cited

U.S. PATENT DOCUMENTS

| | | | |
|---|---|---|---|
| 10,013,060 B2* | 7/2018 | Levesque | G06F 3/016 |
| 10,133,310 B2* | 11/2018 | Kim | G06F 1/1652 |
| 10,180,704 B1* | 1/2019 | Stewart | G06F 1/1652 |
| 10,234,899 B1* | 3/2019 | Brocklesby | G06F 1/1618 |
| 10,303,218 B2* | 5/2019 | Jones | G06F 1/1652 |
| 10,310,565 B2* | 6/2019 | Aoki | G06F 1/1652 |
| 10,318,029 B2* | 6/2019 | Myers | H04M 1/0268 |
| 10,318,061 B2* | 6/2019 | Franklin | G06F 1/1626 |
| 2013/0216740 A1* | 8/2013 | Russell-Clarke | B23K 26/38 428/33 |
| 2013/0219663 A1* | 8/2013 | Cai | G06F 1/1681 16/371 |
| 2014/0123436 A1* | 5/2014 | Griffin | H04M 1/0216 16/221 |
| 2014/0362513 A1* | 12/2014 | Nurmi | G06F 1/1652 361/679.27 |
| 2015/0049428 A1* | 2/2015 | Lee | G06F 1/1652 361/679.27 |
| 2015/0185782 A1* | 7/2015 | Kim | G06F 1/1652 349/12 |
| 2016/0048171 A1* | 2/2016 | Lee | G06F 1/1652 361/679.27 |
| 2016/0195901 A1* | 7/2016 | Kauhaniemi | G06F 1/1652 361/679.27 |
| 2016/0334836 A1* | 11/2016 | Hong | G06F 1/1616 |
| 2017/0094168 A1* | 3/2017 | Kang | H04M 1/0264 |
| 2017/0287385 A1* | 10/2017 | Lian | G09F 9/301 |
| 2017/0374749 A1* | 12/2017 | Lee | E05D 11/0054 |
| 2018/0210514 A1* | 7/2018 | Wang | G06F 1/1616 |
| 2018/0210515 A1* | 7/2018 | Lyles | G06F 1/1616 |
| 2018/0292860 A1* | 10/2018 | Siddiqui | G06F 1/1618 |
| 2018/0295735 A1* | 10/2018 | Ahn | G06F 1/1652 |
| 2019/0033920 A1* | 1/2019 | Yun | G06F 1/1652 |
| 2019/0033925 A1* | 1/2019 | Hong | G06F 1/1681 |
| 2019/0073002 A1* | 3/2019 | Wu | G06F 1/1626 |
| 2019/0082544 A1* | 3/2019 | Park | H05K 5/0017 |
| 2019/0196541 A1* | 6/2019 | O'Neil | G06F 1/1616 |

* cited by examiner

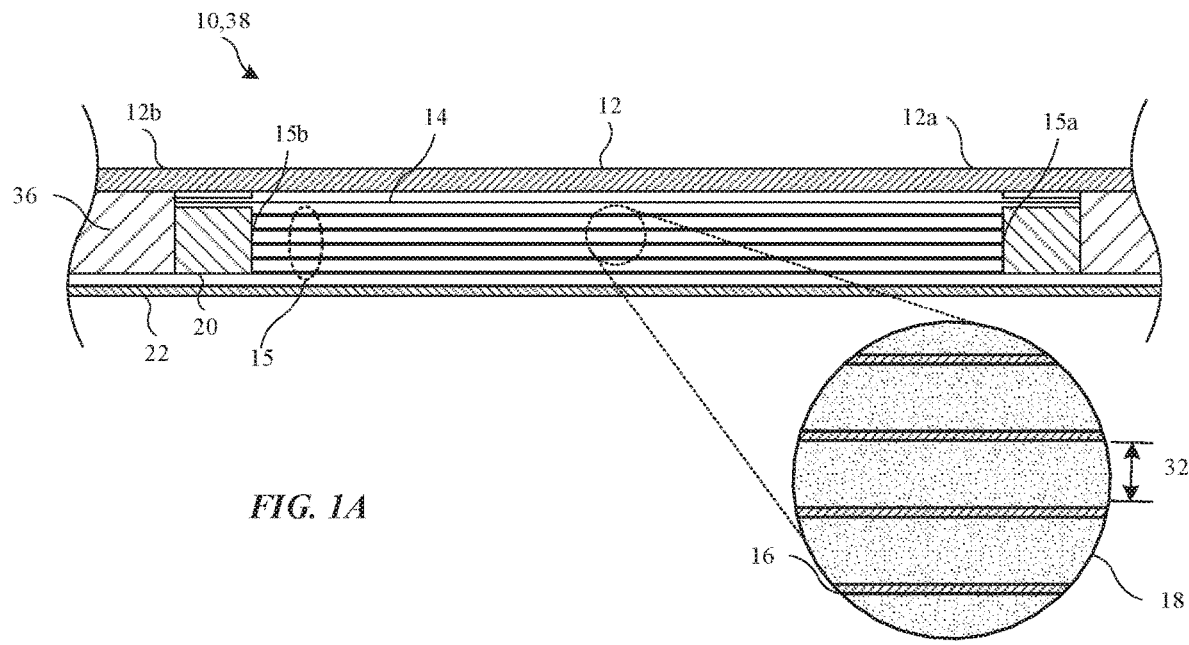
FIG. 1A
FIG. 1B
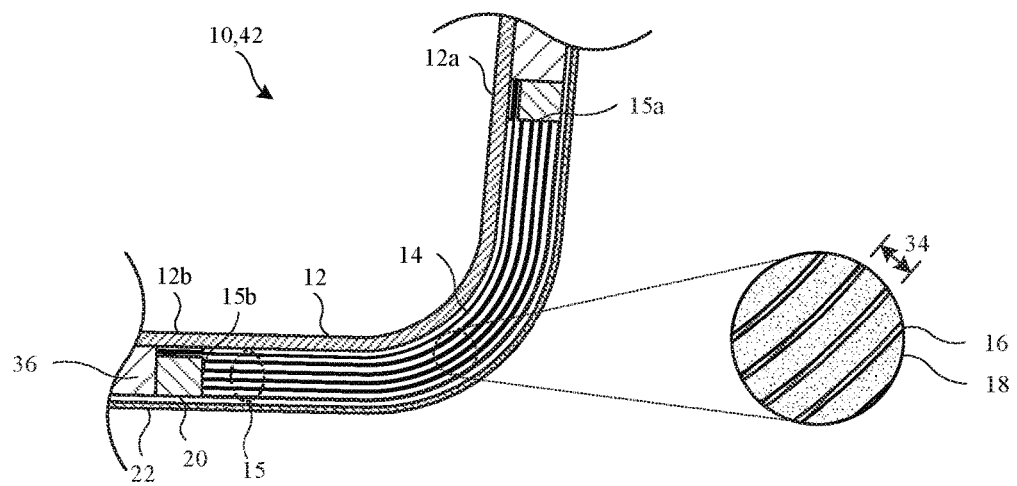
FIG. 2A
FIG. 2B

Section A-A

Section B-B

PLANAR HINGE ASSEMBLY

CROSS-REFERENCE TO RELATED APPLICATIONS

The present application claims the benefit of U.S. Provisional Application No. 62/731,254, entitled "PLANAR HINGE ASSEMBLY," filed Sep. 14, 2018, the content of which is incorporated herein by reference in its entirety for all purposes.

FIELD

The following disclosure relates to an electronic device. In particular, the following disclosure relates to a bending structure in an electronic device that is compliant, adjustable and provides variable applied stiffness.

BACKGROUND

Portable electronic devices are known to include a housing and a cover glass that combines with the housing to enclose components such as a circuit board, a display, and a battery. Also, portable electronic devices are known to communicate over a network server to send and receive information, as well as communicate with a network carrier to send and receive voice communication.

SUMMARY

This paper describes various embodiments related to an adjustable bending structure in a portable electronic device. Specifically, the adjustable bending structure includes a stack of layers that can transition from an uncompressed state to a compressed state.

In one aspect, a personal computing device comprises a single piece body having a seamless overall appearance and that includes a bendable portion that is capable of having a smoothly curved shape. The single piece body includes a first part capable of carrying a display suitable for presenting visual content, and a second part that is capable of carrying an input device suitable for accepting an input action. The personal computing device also includes a multi-state planar hinge assembly carried by the single piece body at the bendable portion and positioned between and in mechanical communication with the first part and the second part. The multi-state planar hinge assembly includes a planar assembly that, in a first state, is characterized as having a first thickness and allows relative movement of the first and second parts with respect to each other. In a second state, the planar assembly is characterized as having a second thickness, less than the first thickness, that is capable of maintaining a fixed angular displacement between the first and second parts.

In another aspect, a portable electronic device is described. The portable electronic device can include a first part that carries a visual display for presenting visual content, a second part that carries an input device, and a solid-state hinge assembly coupled to the first and second part in a manner that allows relative angular movement between the first and second parts. The solid-state hinge assembly can include a bending medium capable of (i) bending in response to an applied force and (ii) providing a resistance to movement in accordance with an amount of bending, and a force actuator physically coupled to the bending medium, the force actuator capable of providing the force.

Further, a method carried out by operating an adjustable bending structure including a stack of layers is described. The stack of interleaved layers can include material capable of bending in response to an applied force. The adjustable bending structure can be in communication with a sensor capable of detecting a shape of the stack and providing a signal, and can be in communication with an actuator capable of receiving the signal and responding by applying a controller force that controls a shape of the stack. A first controller force can correspond to a first shape and a second controller force can correspond to a second shape. The method includes the actuator receiving a first signal provided by the sensor. The first signal can correspond to the first controller force. Subsequently, the actuator can apply the first controller force to the stack in accordance with the first signal, and the first controller force causes the stack to take on the first shape. Next, the actuator can receive a second signal provided by the sensor. The second signal can correspond to the second controller force. Thereafter, the actuator can apply the second controller force to the stack in accordance with the second signal, and the second controller force causes the stack to take on the second shape that is different from the first shape.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 1A shows a cross sectional view of a stiffness modulator according to a first embodiment in an uncompressed state;

FIG. 1B shows a magnified cross sectional view of layers in the stiffness modulator of FIG. 1A;

FIG. 2A shows a cross sectional view of the stiffness modulator according to the first embodiment in a compressed state;

FIG. 2B shows a magnified cross sectional view of the layers in the stiffness modulator of FIG. 2A;

Figure 3A:
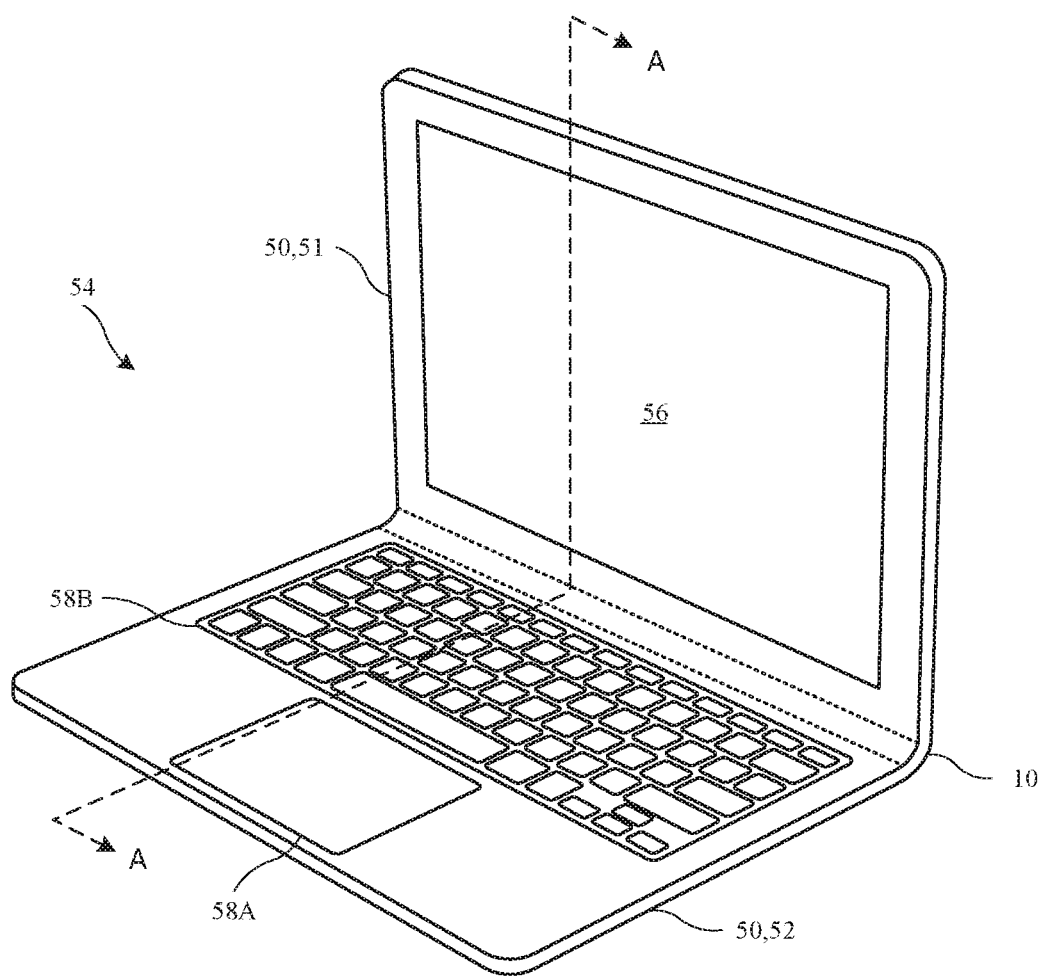
FIG. 3A shows a stiffness modulator according to a second embodiment in a laptop-computing device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

Stiffness modulator technology can be used to create a bending structure that allows a user to switch from a non-composite state where layers are capable of moving relative to each other to a composite state where there is reduced slippage between layers in. In one embodiment, the layers cooperate with an actuator, such as a vacuum pump, for example, to provide frictional pressure between layers in the composite state. The change in stiffness is adjustable up to an order of the number of layers squared. Thus, the more layers, the greater stiffness the bending structure is capable of providing.

Accordingly, stiffness modulator technology provides advantages in forming geometries or designs that have more compliant, natural shapes while allowing for rigidity in the composite state. In addition, minimal energy is required in each of the composite and non-composite state. Significant energy is only used when changing between the composite and non-composite states, thus reducing long-term energy consumption. The positional rigidity that stiffness modulator technology provides is customizable, easy to use and adaptable to a variety of systems and configurations. Accordingly, this technology provides an advantageous solution to and replacement of customarily large and heavy mechanisms.

The following describes advantageous applications of stiffness modulator technology to consumer level products. In one embodiment, an adjustable bending structure can incorporate a stack of layers that flexibly move between an uncompressed state and a compressed state through a mechanical force applied from an actuator. The compressed state has a thickness less than a thickness of the uncompressed state because of the reduction in separation distance between the layers of the stack. The compressed state also has a greater resistance to movement than the uncompressed state since the decreased separation distance between the layers of the stack create more friction. In other embodiments, adjustable bending structures such as a hinge assembly can be used, for example, in laptop-computing devices connecting a display to an input medium, a smart cover connecting a base to a lid, and act as an interface to connect two tablets. In further embodiments, buttons and sensors can provide feedback to a processor to vary the applied mechanical force in various conditions, such as angular positions, between the uncompressed and the compressed states of the adjustable bending structure. Haptic surfaces describe another embodiment that can use the adjustable bending structure to create a flat keyboard edge definition for an improved typing experience. Finally, wearable devices such as a glove and a knee brace can use adjustable bending structures by varying the number of layers at different locations of the wearable device to adjust a relative stiffness and vary an applied resistance to movement.

The following disclosure relates to an electronic device, such as a mobile communication device that takes the form of a laptop-computing device, a smart phone cover or a tablet computer device. The electronic device can include several enhancements and modifications not found on traditional electronic devices. For example, the electronic device may include a bending medium connecting a display assembly to an input medium such as a keyboard thereby providing a hinge assembly adjustable angularly and adjustable in applied resistance. The electronic device also includes haptic surfaces having the bending medium that creates an input device with a flat keyboard edge definition for an improved typing experience. Wearable devices such as a glove and a knee brace are electronic devices that use the bending medium and varying the number of layers at different locations of the electronic device to adjust a relative stiffness and vary an applied resistance to movement. These and other embodiments are discussed below with reference to FIGS. 1-11. However, those skilled in the art will readily appreciate that the detailed description given herein with respect to these Figures is for explanatory purposes only and should not be construed as limiting.

FIG. 1A-2B illustrates an embodiment of an adjustable bending structure 10. In the described embodiment, the adjustable bending structure 10 can be a continuous and smoothly curved profile used in a bendable consumer product as a multi-state bending assembly. For example, as shown in FIG. 1A, the flexible consumer product can include flexible display 12 that overlays and is supported by adjustable bending structure 10. It should be noted that flexible display 12 can take the form of an organic light emitting diode (OLED). Accordingly, flexible OLED display panel 12 includes organic light emitting diodes arranged to create a flexible display panel as commonly understood by one skilled in the art. In this way, adjustable bending structure 10 can control a shape of flexible display 12. Flexible display 12 can include a first portion 12a electrically connected to a second portion 12b by way of a trace layer 14 that can be used to pass signals there between. In one embodiment, a first portion 12a can be used to present visual content whereas a second portion 12b can be used to emulate an input device (such as a keypad, touch pad, etc.) that can be used to provide control signals. The electronic trace layer 14 can include a touch sensor or a flexible cable to power the adjustable bending structure 10. The electronic trace layer 14 can be disposed underneath the flexible OLED display panel 12 and supplies electrical communication to and from a circuit board and other electrical components.

The adjustable bending structure 10 can include a layered stack 15 of bendable material 16 and an interlayer 18 interposed between each of the layers 16 of bendable material. The layered stack 15 can be a planar assembly including the layers 16. The layers 16 are each capable of bending in unison in response to a force applied thereto and can be separated from each other by a separation distance 32, 34. The layers 16 advantageously retain a continuous and smooth profile regardless of the applied force. The stack 15 can include a first end 15a on one end of the stack 15, and a second end 15b on an opposite end of the stack 15. That is, the first and second ends 15a, 15b are opposite each other. The first and second ends 15a, 15b are configured to couple to various electronic devices as described in detail below.

In one embodiment, the layers 16 can have an interleaved structure. In a first state or an uncompressed state 38 (FIG. 1B), the layers 16 can separate from each other by first separation distances 32 such that the stack 15 is characterized as having a first thickness that results in a first resistance to relative movement between electronic devices coupled thereto. For example, relative movement of the first portion 12a and the second portion 12b can take place with respect to each other.

In a second state or a compressed state 42 (FIG. 2A 2B), layers 16 can separate from each other by second separation distances 34 that is less than the first separation distance 32 such that the stack 15 has a second thickness that is less than the first thickness. In the compressed state 42, the reduced separation distance 34 results in greater physical coupling between layers 16 such that the compressed state exhibits a second resistance to relative movement between electronic devices coupled thereto. The second resistance to relative movement is greater than the first resistance to relative movement. In this way, the compressed state 42 of the adjustable bending structure 10 is capable of supporting second portion 12b at any suitable angle with respect to portion 12a. Specifically, a fixed angular displacement can be maintained between the first portion 12a and the second portion 12b.

In one embodiment, the interleaved layers 16 can take the form of electroactive polymer layers 16 that can be formed from, for example, plastic, metal or glass such as polycarbonate, ABS plastic, PET plastic, silicone, aluminum, steel, FR-4 composite, willow glass and Polyimide (flex). In this way, the stack 15 of the electroactive polymer layers 16 can flex when in the uncompressed state 38 and becomes stiffer when in a compressed state 42.

Moreover, adjustable bending structure 10 can also include a flexible battery 20. The formed flexible battery 20 is a power supply that can provide electric power to the electrical components of the adjustable bending structure 10. A cosmetic skin 22 can be an aesthetic surface that encloses the adjustable bending structure 10.

The adjustable bending structure 10 can include an actuator 36 to provide an applied force to the interlayer 18, resulting in an applied force between the layers 16 of the stack 15. In one embodiment, the actuator 36 can be a user applying a force to the adjustable bending structure 10. The user can provide an external force to adjust the shape or position of the adjustable bending structure 10 in the uncompressed state.

In another embodiment, the actuator 36 is a physical structure that can be disposed adjacent to or integral with the second portion 12a. A plurality of configurations and positions of the actuator 36 of the adjustable bending structure 10 is contemplated herein. The actuator 36 can include, for example, a pneumatic air pump that provides air pressure, an electrostatic actuator/polymer that adjusts a height in a Z-axis, a vacuum pump that squeezes layers in a sealed environment to provide stiffness, and an air bladder that acts as a balloon to raise a surface. Other actuators 36 can include electromagnetic actuators such as a voice coil and magnets to create a magnetic field. These electromagnetic actuators can provide a frictional force, as well as a magnetic force to the adjustable bending structure 10.

The stack 15 of layers 16 in the adjustable bending structure 10 can bend in unison and is capable of varying stiffness in a composite stack 15 having multiple layers 16. This is dependent on a variety of factors including, for example, the material stiffness of the layers 16, the layer 16 thickness, the number of layers 16, the viscosity of the interlayer used 18 and the type of force released from the actuator 36. When adjusting the number of layers 16 and keeping all other factors constant, changing from an uncompressed state 38 to a compressed state 42 results in the stack 15 being stiffer by a ratio of the number of layers 16 squared.

When the stack 15 of layers 16 is in the uncompressed, non-composite state 38, as illustrated in FIGS. 1A and 1B, the adjustable bending structure 10 can be very flexible in response to an external applied force. The layers 16 can be part of a first thickness of the adjustable bending structure 10 and can freely move relative to each other by overcoming a first resistance to relative movement between electronic devices coupled thereto. The first resistance to relative movement is small and primarily consists of frictional force. The mechanical coupling between the layers 16 establishes the first resistance to relative movement between electronic devices coupled thereto. FIG. 1B illustrates a first separation distance 32 between at least some of the adjacent layers 16 that can provide the free motion and flexibility of the adjustable bending structure 10. Accordingly, the geometry of the adjustable bending structure 10 can advantageously be very compliant, organic or natural in shape.

When the stack 15 of layers 16 is in the compressed, composite state 42 as illustrated in FIG. 2A, the adjustable bending structure 10 can become stiffer in response to the external force. The layers 16 can be substantially fixed with respect to each other and can form part of a second thickness of the adjustable bending structure 10 where the layers 16 can remain planar and shear stress can transfer between the layers 16. As a result, a greater external force is needed to overcome a second resistance to relative movement between electronic devices coupled thereto caused by the mechanical coupling between the layers 16. Further, the second thickness is smaller than the first thickness and the second resistance to relative movement is greater than the first resistance to relative movement. FIG. 2B illustrates a second separation distance 34 between at least some of the adjacent layers 16 is smaller than the first separation distance 32. Because of the smaller thickness and smaller separation distance, increased friction between the layers 16 can make the stack 15 stiffer and less pliable. This rigidity can be desired for operation of the adjustable bending structure 10.

The actuator 36 can cooperate with the interlayer 18 and the layers 16 in the stack 15 of the adjustable bending structure 10 to shift between the uncompressed state 38 and the compressed state 42. Specifically, in the uncompressed state, the actuator 36 can permit a release of mechanical energy from the stack 15 of layers 16. This can allow at least some of the interleaved layers 16 to maintain the first separation distance 32 so as to be able to move with respect to each other. In other words, the released mechanical energy can be primarily in the form of friction or pressure between layers 16 that allow the layers 16 move more freely. In the compressed state, the actuator 36 can prevent the release of mechanical energy from the stack 15 of layers 16. This can allow at least some of the interleaved layers 16 to maintain the second separation distance 34. In particular, the stored mechanical energy can be primarily in the form of friction or pressure between layers 16 that can create resistance between the layers 16 and prevents movement.

In both the compressed and uncompressed state, the stack 15 advantageously retains a continuous and smooth profile or shape in response to the applied force. The layers 16 in the stack 15 advantageously provide a configurable and unbroken surface that is cosmetically appealing and versatile. Such a configuration is particularly beneficial when compared to a discontinuous hinge assembly or clutch assembly commonly known in the art. These assemblies known in the art are broken into various components, have an unorthodox profile surface and rigid in application.

The adjustable bending structure 10 advantageously does not require external energy when in the uncompressed, non-composite state 38 or the compressed, composite state 42. That is, the adjustable bending structure 10 can be in a dormant state when pressurized or depressurized. Instead, the electroactive polymer layers 16 can use electrostatic force to generate pressure across the layers 16. External energy is only required to operate the actuator 36 when shifting between the uncompressed state 38 and the compressed state 42.

Further, the adjustable bending structure 10 can advantageously provide a user flexibility to switch back and forth between the uncompressed state 38 and the compressed state 42. The adjustable bending structure 10 can be advantageously reconfigurable to provide flexibility in shape, meet various space requirements and configurable for different operational conditions. This is readily understood when the adjustable bending structure is the integrated hinge assembly 10 used in a variety of industrial applications. Such advantages can be an improvement over the bulkiness and non-configurable, strict application of a standard ratcheting mechanism, a mechanical hinge engaging detents or a friction clutch, for example.

Figure 3B:
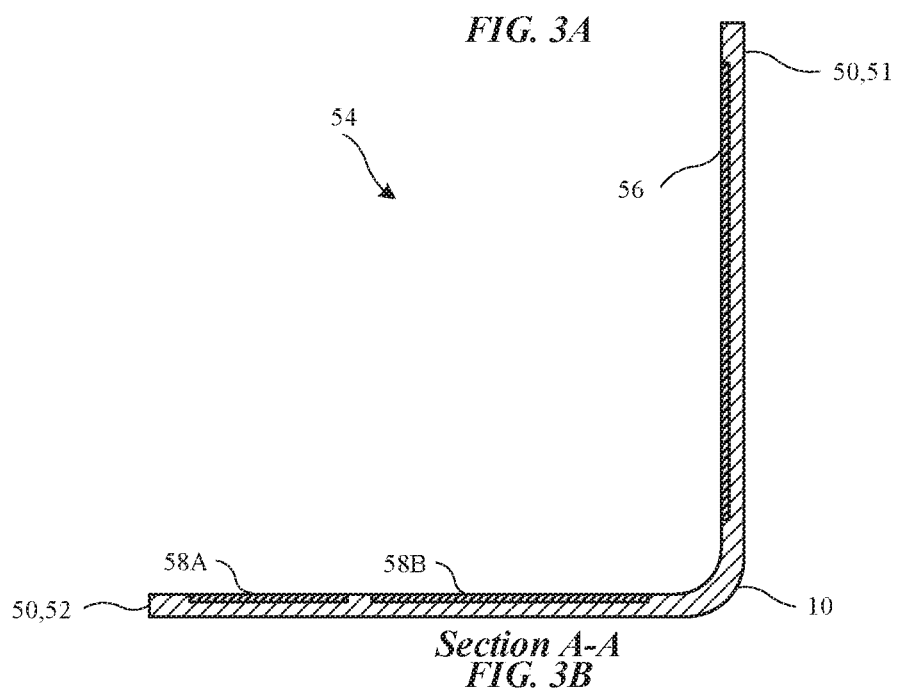
FIG. 3B shows a cross sectional view A-A of the laptop-computing device of FIG. 3A.

FIGS. 3A and 3B illustrate a second embodiment of a stiffness modulator that can be in the form of the integrated hinge assembly, the multi-state bending assembly or a solid-state hinge 10 carried by or disposed within the multipart electronic system 54. The multipart electronic system 54 can be a laptop-computing device having a single piece body. In other words, the multipart electronic system 54 can form a seamless overall appearance that includes a continuous, smooth and curved shape.

As illustrated in FIG. 3B, the portable electronic device 50 can include the first and second portions 51, 52, which supports the laptop-computing device 54. The laptop-computing device 54 can include the first part 56 and the second part 58. The multi-state bending assembly 10 can be positioned between and in mechanical communication with the first and second parts 56, 58. The first part 56 can be a lid that carries a visual display for presenting visual content. The second part 58 can be a base that carries an input device that is suitable for accepting an input action like a touchpad 58a and/or a keyboard 58b, for example, that supports the lid. The lid 56 can also carry a camera assembly and a speaker assembly as commonly understood by one of ordinary skill in the art.

The multi-state bending assembly or solid-state hinge 10 can seamlessly couple the first part 56 and the second part 58 to allow relative angular movement and a fixed angular displacement. Specifically, the solid-state hinge 10 can include the layers 16 that act as a bending medium capable of bending in response to an applied force and provide resistance to relative movement between the first and second parts 56, 58 based on the amount of bending. The force actuator 36 can physically couple to the bending medium 16 and provides the force.

The force actuator 36 is also capable of providing a first force corresponding to a first angular displacement between the first part 56 and the second part 58, and a second force corresponding to a second angular displacement between the first part 56 and the second part 58. The first angular displacement can correspond to a first angle suitable for presentation of the visual content and the second angular displacement can correspond to a second angle that is suitable for use of the touchpad 58a and/or keyboard 58b. In this configuration, the first and second angular displacements are different and can represent various angular positions. The first and second angular displacements show the relative freedom of angular movement between the first part 56 and the second part 58 in the uncompressed state. Further, the first and second angular displacements show a means to maintain a fixed angle in the compressed state. As similarly described above, the force actuator 36 can include, for example, a user applied force, a pneumatic air pump, an electrostatic actuator/polymer, a vacuum pump, and an air bladder.

In an embodiment, a bendable portion represents a smoothly curved shaped coupling region between the first part 56 and the second part 58. In other words, the bendable portion is a housing part enclosing the planar assembly 15 of layers 16 and connects the first part 56 to the second part 58.

Figures 4A, 4B:
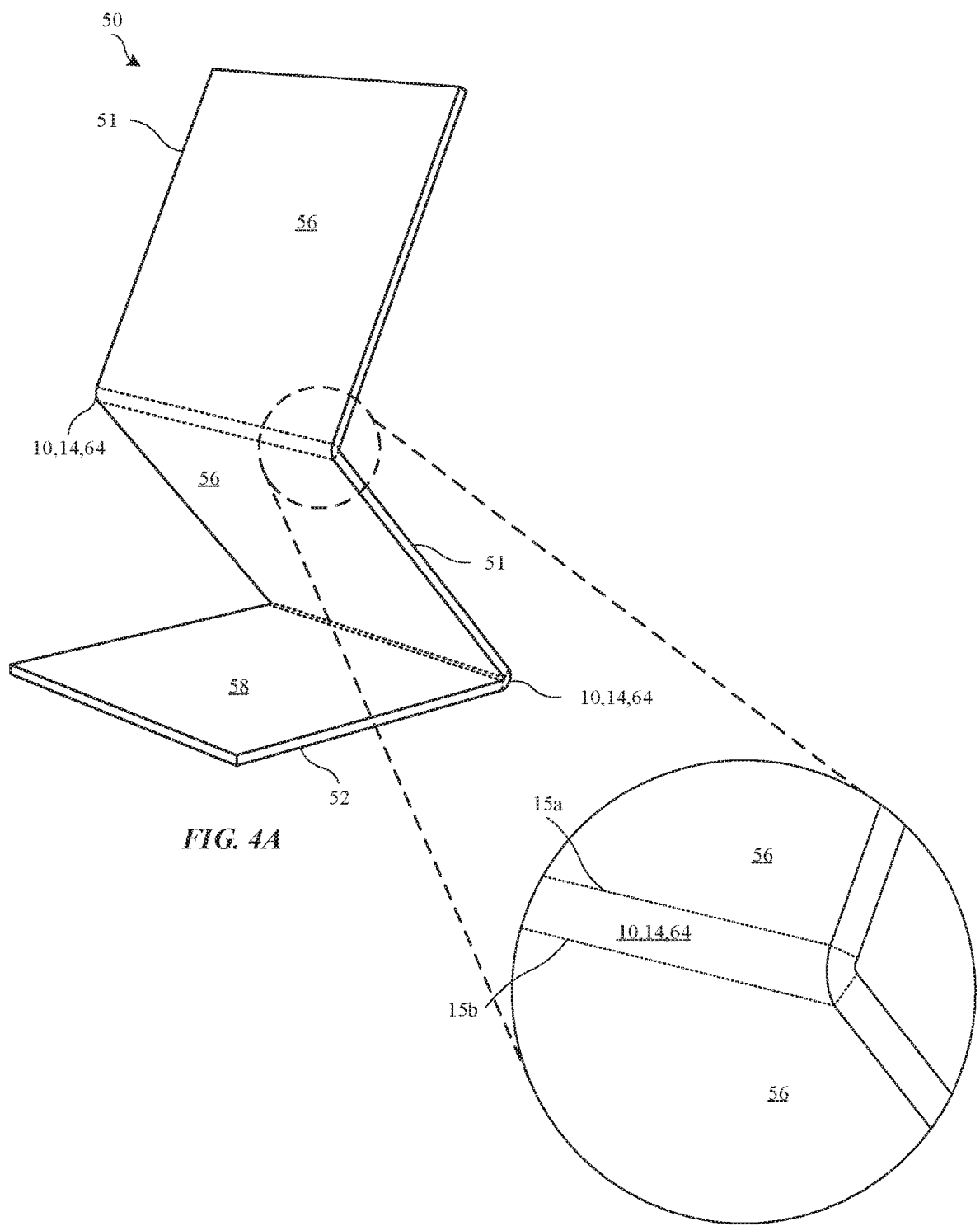
FIG. 4A shows a stiffness modulator according to a third embodiment in a portable electronic device.
FIG. 4B shows a magnified view of the stiffness modulator of FIG. 4A.

FIG. 4A-4B illustrates a third embodiment of a stiffness modulator that can be in the form of the integrated hinge assembly or multi-state bending assembly 10 and that cooperates with a portable electronic device or personal computing device 50. The portable electronic device 50 can include a first portion 51 and a second portion 52. The first portion 51 can secure to a first part 56 of a multi-part electronic system 54. The second portion 52 can secure to a second part 58 of the multi-part electronic system 54. The first part 56 and the second part 58 can be separate and independent from each other. Preferably, the multi-state bending assembly 10 couples the first part 56 and the second part 58 to provide a single piece body. The stack 15 of the integrated hinge assembly 10 can include the first end 15a that can couple to the first part 56 and the second end 15b that can couple to the second part 58. The first part 56 can be electrically connected to the second part 58 by way of the trace layer 14 that can be used to pass electrical signals or information there between.

As illustrated in FIG. 4A, the first part 56 of the multi-part electronic system 54 can be an electronic device such as a first tablet device having a display capable of presenting visual content. The second part 58 of the multi-part electronic system 54 can be an electronic device such as a second tablet device having a display capable of presenting visual content in the form of an input device suitable for accepting an input action. The input device can be a touchpad and/or a keyboard, for example. FIG. 4B illustrates that the first and second parts 56, 58 can communicate with each other by way of the electronic trace layer 14 or another wired connection 64 that is carried by the stack 15 of layers 16 in the integrated hinge assembly 10.

The actuator 36 in the integrated hinge assembly 10 can provide a first and a second force to allow the portable electronic device 50 to rotate between a first angular displacement 60 based on the first force and a second angular displacement 62 based on the second force. The first angular displacement 60 can correspond to a first angle suitable for presentation of the visual content and the second angular displacement 62 can correspond to a second angle that is suitable for use of the touchpad and/or keyboard. Accordingly, the first angular displacement 60 and the second angular displacement 62 can be different.

FIGS. 5A-5D illustrates a fourth embodiment of the stiffness modulator being the integrated hinge assembly 10 in various configurations in the portable electronic device 50. Specifically, the electronic device 50 can have the first portion 51 carrying the first part 56 being the visual display or tablet device, and the second portion 52 carrying the second part 58 being the input device such as the touchpad and/or keyboard.

In FIGS. 5A-5D, the stiffness modulator being the integrated hinge assembly 10 can connect the first portion 51 to the second portion 52 and can conform into a variety of shapes to achieve different orientations of the first part 56. The integrated hinge assembly 10 can provide a smooth and continuous surface that is unbroken and configurable in a variety of positions. Such a configuration is advantageous when compared to a typical hinge assembly that provides rigid, discontinuous edges between two connected surfaces.

The vacuum actuator 36 of the integrated hinge assembly 10 can embed into the second part 58 to provide force for the compressed and uncompressed states. Specifically, as described above, the integrated hinge assembly 10 can be in the uncompressed state to conform to a variety of shapes and angles, including the first or second angular displacement. Subsequently, the integrated hinge assembly 10 can transition into the compressed state to substantially fix the shape of the integrated hinge assembly 10 and substantially fix the orientation of the first part 56 at the first or second angular displacement or in any other shape.

Figure 6:
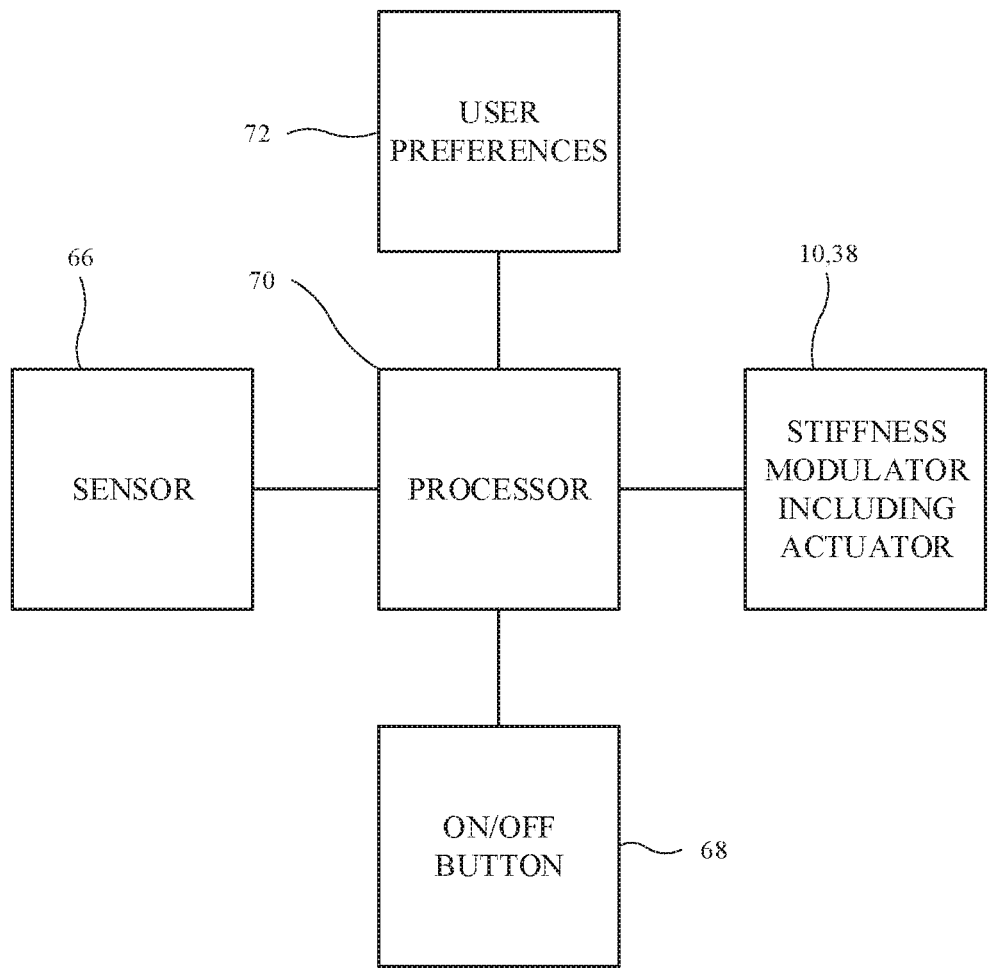
FIG. 6 is a block diagram of an electronic device suitable for use with the described embodiments.

FIG. 6 illustrates a block diagram of electrical components in the portable electronic device 50 suitable for use with the stiffness modulator 10 described in the embodiments herein. The electrical components can include a sensor 66, an on/off button 68, a programmable processor 70, user preferences 72 and the actuator 36 in the stiffness modulator 10. The sensor 66 can include any of an angular position sensor to measure an angular position of the stack 15 of layers 16, a velocity sensor to measure a speed at which the stack 15 of layers 16 is being moved, and a strain sensor to measure an amount of bending of the stack 15 of layers 16. The sensor 66 can be substantially fixed to the stack 15 of layers 16 and can provide signal feedback to the processor 70.

The on/off button 68 is another type of sensor that is capable of providing a first signal in accordance with the uncompressed state and a second signal in accordance with the compressed state. The user can activate the on/off button 68 to instruct the processor 70 to change the applied force released from the actuator 36. The user preferences 72 are preprogrammed conditions that can instruct the processor 70 to provide variable force output from the actuator 36 based on different settings or positions.

The processor 70 can communicate with the sensor 66, the on/off button 68 and the user preferences 72 to manipulate the operation of the actuator 36 in the stiffness modulator 10. For example, the processor 70 is capable of receiving signals from any of the electrical components and can be programmed to correlate different levels of mechanical force or controller force instructions in relation to a detected angle, shape or speed data. The processor 70 can then activate the actuator 36 in the stiffness modulator 10 to apply the mechanical force instructions or controller force instructions received.

For example, the processor 70 can instruct the actuator 36 to apply different levels of force based on different angular position signals received from the angular position sensor. Such a configuration can be helpful by applying a significant force when the first part 56 and the second part 58 of the laptop-computing device 54, as illustrated in FIG. 4, are close together (closed position) and decreasing the force as the two separate and open (open position). Such a configuration can prevent the first and second parts 56, 58 from contacting each other too quickly in the closed position of the laptop-computing device 54. This configuration can also minimize the laptop-computing device 54 from opening unnecessarily. However, as the laptop-computing device 54 opens by separating the first and second parts 56, 58, the lower applied force can allow for the opening operation to become easier. Such a configuration can advantageously improve the safety and robustness of the laptop-computing device 54.

Based on various signal information received from the sensor 66, the processor 70 can instruct the actuator 36 to apply a controller force that controls a shape of the stack 15. Specifically, a first controller force can correspond to a first shape and a second controller force can correspond to a second shape. More specifically, the actuator 36 can apply the first controller force to the stack 15 in accordance with a first signal from the sensor 66 to cause the stack 15 to take on a first shape. The actuator 36 can apply the second controller force to the stack 15 in accordance with a second signal from the sensor 66 to cause the stack 15 to take on a second shape that is different than the first shape. The first and second controller forces create shapes in the compressed state. When the controller force is a null force, the shape corresponds to an uncompressed state. Such a configuration can be advantageous in situations such as those illustrated in FIGS. 5A-5D and FIGS. 8A-8F where various positions and orientations may be desired for different purposes.

The processor 70 can also instruction the actuator 36 to apply different levels of force based on different velocities signals received from the velocity sensor. Specifically, the velocity sensor can detect the speed of the first part 56 moving relative to the second part 58 of the laptop-computing device 54. If the processor 70 identifies the velocity to be too high, the processor 70 can instruct the actuator 36 to increase the applied force to dampen the high velocity so that the first and second parts 56, 58 move more slowly relative to each other and are more stable. Such a configuration can be helpful when opening and closing the laptop-computing device 54.

Figure 5A:
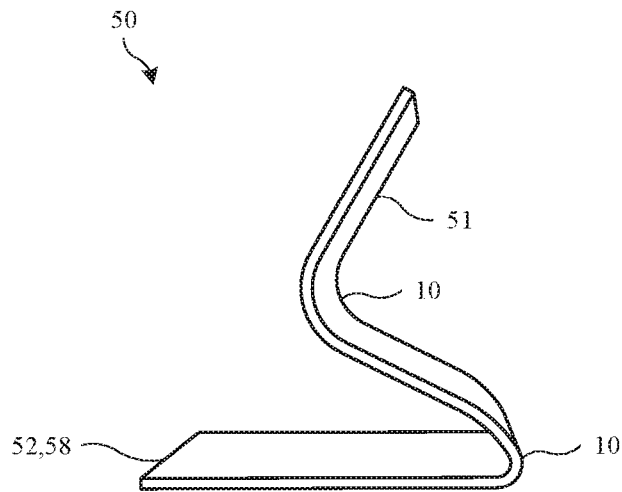
FIGS. 5A-5D show a stiffness modulator according to a fourth embodiment in different configurations of a portable electronic device.
Figure 5B:
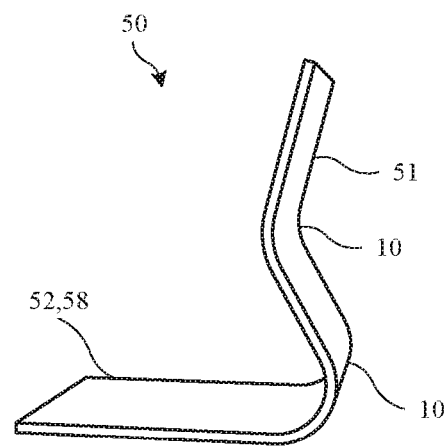
Figure 5C:
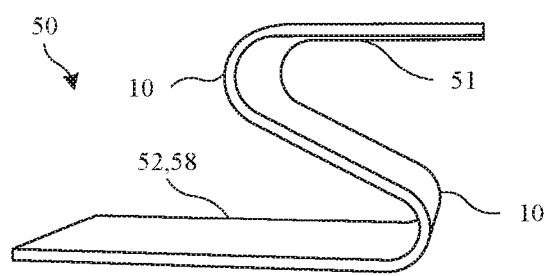
Figure 5D:
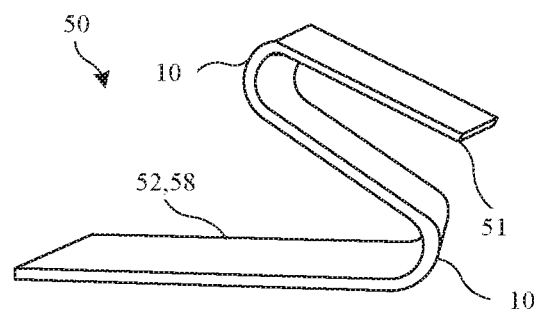

Further, the processor 70 can instruct the actuator 36 to apply different levels of force based on different strain signals received from the strain sensor. Specifically, the processor 70 can receive different strain signals from the stack 15 of layers 16 of the integrated hinge assembly 10 as illustrated in FIGS. 5B-5D. Based on the received strain signals, the processor 70 can instruct the actuator 36 to apply different forces to control the speed of movement between the first and second parts 56, 58. Such a configuration can be helpful to encourage and/or avoid different positions between the first and second parts 56, 58 of the portable electronic device 50.

Finally, the processor 70 can instruct the actuator 36 upon receiving a signal from the on/off button 68 to act on the stack 15 of layers 16 based on one of the compressed and uncompressed states. Such a configuration can be helpful when opening and closing the laptop-computing device 54 so that the transition takes place and the laptop-computing device 54 is substantially fixed in the open or closed position.

Figure 7A:
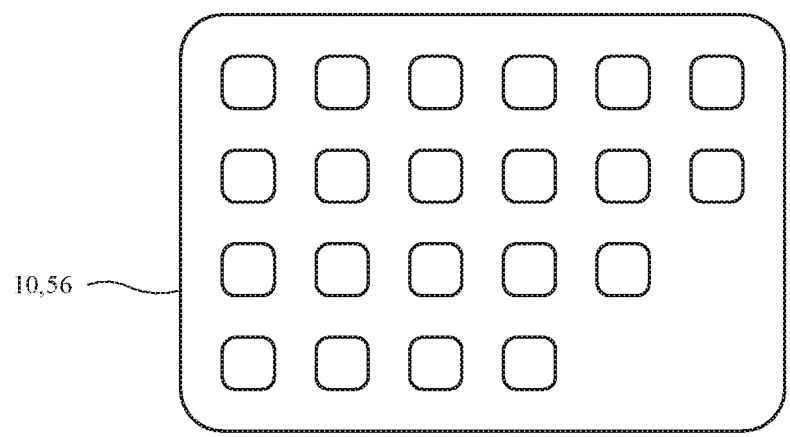
FIG. 7A shows a stiffness modulator according to a fifth embodiment being an electronic device in an active state.
Figure 7B:
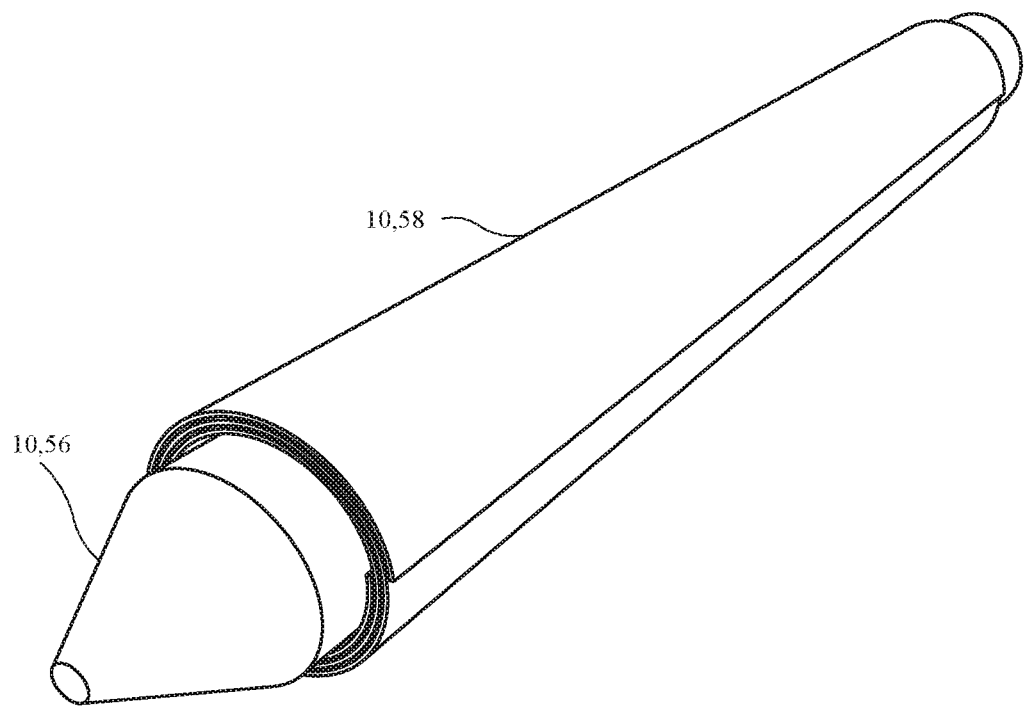
FIG. 7B shows the electronic device of FIG. 7A in a dormant state.
Figure 8A:
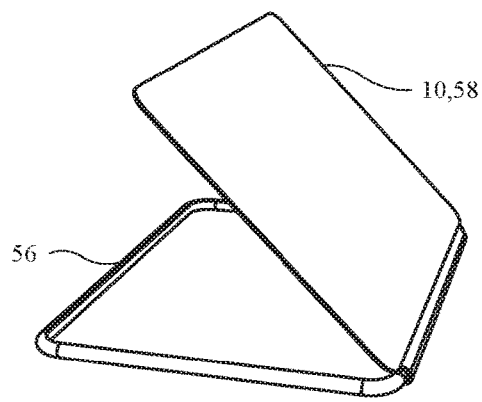
FIGS. 8A-8F show a stiffness modulator according to a sixth embodiment in a carrying case having different configurations for use with a portable electronic device.
Figure 8B:
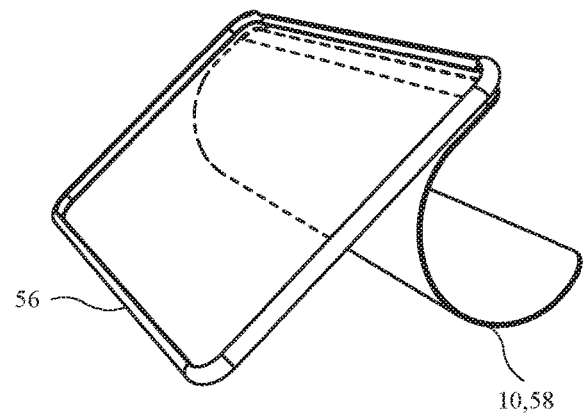
Figure 8C:
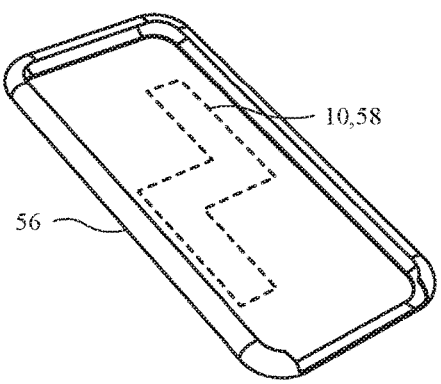
Figure 8D:
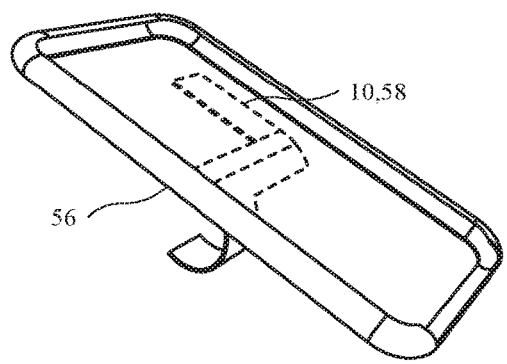
Figure 8E:
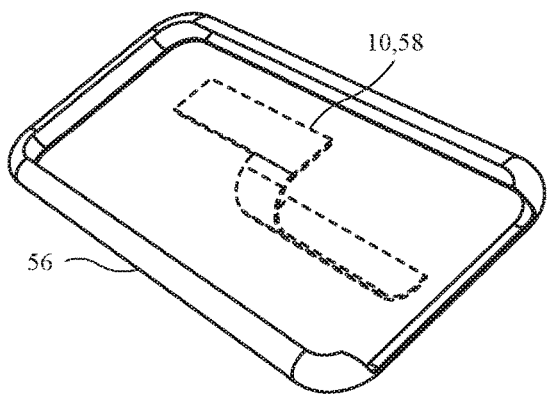
Figure 8F:
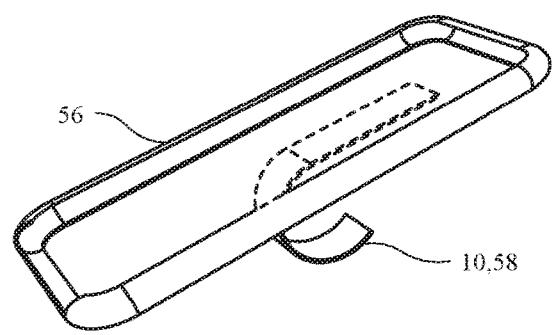

FIG. 7A-7B illustrates a fifth embodiment where the stiffness modulator 10 can be the flexible OLED display of any electronic device. FIG. 7A illustrates an active state and FIG. 7B illustrates a dormant state. In the active state, the electronic device can be a normal functioning device such as the tablet device 56, 58. In this active state, the electronic device 10 can be in the compressed state for operation.

After use, as illustrated in FIG. 7B, the tablet device 56 can transition to the uncompressed state. Accordingly, the tablet device 56 is rolled up for storage purposes. Subsequently, the tablet device 56 can transition back to the compressed state to substantially fix the shape. The tablet device 58 can be shaped as a pen in the compressed state and stored inside tablet device 56.

In the uncompressed state, the tablet devices 56, 58 can be advantageously flexible enough to be rolled up for storage purposes and to be formed into a pencil. In the compressed state, the tablet device 58 can be advantageously rigid enough to draw and write as a pencil on the tablet device 56. Accordingly, the tablet devices 56, 58 can advantageously be continuous and foldable displays without bulky mechanical parts.

FIGS. 8A-8F illustrate a sixth embodiment of the stiffness modulator 10 being a part of a carrying case of a portable electronic device such a smart phone. Specifically, the first part 56 can be a base of a phone cover and the second part 58 is a smart cover formed by the stiffness modulator 10. The base 56 can movably couple to the smart cover 58 via the stack 15 of layers 16 in the stiffness modulator 10 of the smart cover 58. The base 56 of the phone cover is commonly understood by one skilled in the art.

In operation, the smart cover 58 can substantially cover the base 56 to deactivate the smart phone. The smart cover 58 can also be in the uncompressed state to be shaped into a variety of positions as illustrated. The shapes can advantageously be smooth and continuous to provide improvements in handling, aesthetics and configurability. When the desired shape or position is achieved, the smart cover 58 can transition into the compressed state to lock the shape or position in place. Accordingly, the smart cover 58 can be used to tilt the base 56 carrying the smart phone in a variety of orientations.

Figure 9:
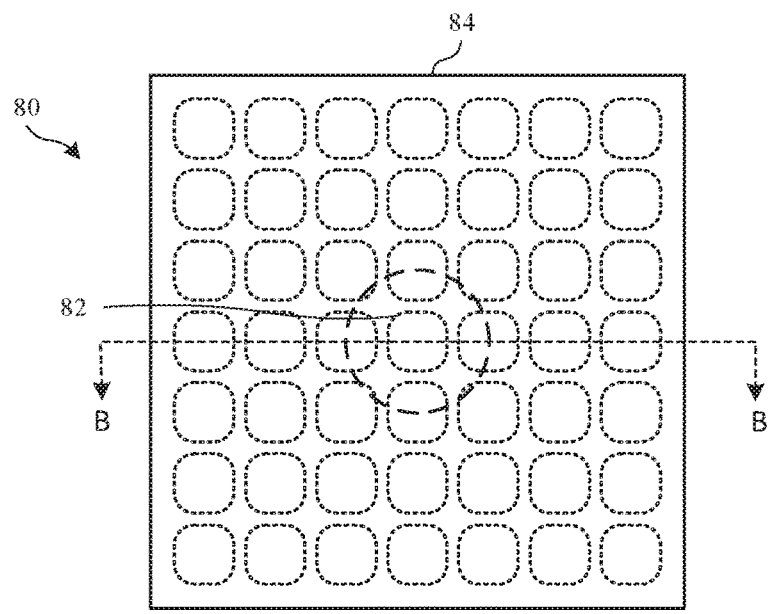
FIG. 9 shows a stiffness modulator according to a seventh embodiment being a haptic surface.
Figure 10:
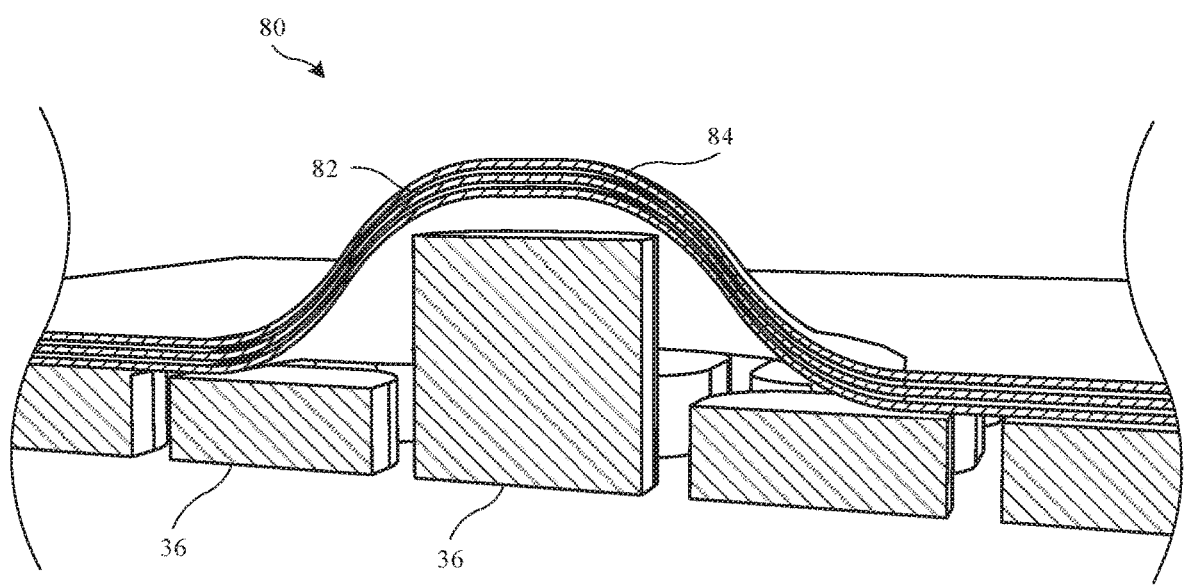
FIG. 10 shows a cross sectional view B-B of the haptic surface of FIG. 9.

FIGS. 9 and 10 illustrate a seventh embodiment of a stiffness modulator 10 being an adjustable bending surface of a haptic surface such as a flexible touchscreen 80. When the touch screen 80 is used as an input device, such as a keyboard, for example, the user does not have a typical typing experiencing. The sound or feel of typing on a flat touchscreen does not provide a high quality typing experience to the user when compared to a keyboard.

In this embodiment, different portions 82 of the stack 15 of layers 16 in the touchscreen 80 can be bent or raised. As illustrated in FIG. 10, the actuator 36 can be a liquid filled bladder, an air bladder or a pneumatic bladder and the actuator 36 can be placed underneath the top surface of the touchscreen 80. Specifically, the raised portion 82 can be arranged like a keyboard on the touchscreen 80. A flat keyboard edge definition 84 can be disposed between each raised portion 82. Accordingly, key registration can be in the XY axis and the raised portion 82 of the touchscreen 80 is in the Z-axis. The raised portion 82 of the touchscreen 80 can also vibrate, slightly move or sense pressure via the actuator 36 upon contact when programmed to do so by the processor 70.

In operation, the touchscreen 80 can flex in the uncompressed state. A plurality of actuators 36 can be arranged underneath a top surface of the touchscreen 80 where each actuator 36 represents a key on the keyboard. The touchscreen 80 can also be in the compressed state and operate typically as understood by one skilled in the art.

When the touchscreen 80 can transition to the compressed state to create a keyboard surface, the plurality of actuators 36 can provide a bladder force on a bottom surface of the touchscreen 80 to raise and bend the top surface of the touchscreen 80. The bladder force can be maintained in the plurality of actuators 36 to set the compressed state of the touchscreen 80. Accordingly, each raised surface 82 can be formed and be disposed over one of the plurality of actuators 36. Further, flat keyboard edge definitions 84 can be disposed between each raised surface 84 and above the spaces where the plurality of actuators 36 are not present.

Such a configuration advantageously can create a discrete and defined surface on the touchscreen 80 for each letter. The user can have a better typing experience because each letter has a proud key on the touchscreen 80.

The haptic surface can also create a custom surface topography using the actuators 36 where the haptic surface is flexible in the uncompressed state and rigid in the compressed state. The amount of detail on the haptic surface can depend on the number of actuators 36 present. The actuators 36 can be stimulated to provide haptics to adjust the haptic surface to a desired orientation in the uncompressed state and then substantially fix the haptic surface in the compressed state. Other applications of this embodiment can include a braille display and custom button shapes for recognizable user interfaces.

An eighth embodiment of the stiffness modulator can be a wearable device such a glove device. A ninth embodiment of the stiffness modulator can be a wearable device such as a knee brace device. An elbow sleeve and other wearable devices can also similarly incorporate the stiffness modulator as described below. The wearable device can be used in virtual reality, augmented reality and mixed reality settings. Typically, to touch a virtual object, a physical structure is needed. The glove device and the knee brace device according to these embodiments advantageously does not require a physical structure to achieve the virtual reality, augmented reality and mixed reality settings.

The construction and operation principles of the glove device can be similar and equally applicable to the knee brace device. Specifically, to mimic a virtual object instead of relying on a physical structure, the wearable device can include a stack 15 of layers 16 that are overlaid on a hand or knee, for example. The wearable device can include a variable number of layers 16 at different locations. For example, more layers 16 can be disposed above joints of the hand and the kneecap where movement can take place. This is because at the locations of movement, resistance to relative movement between various muscles and joints is desired to be controlled. On the other hand, less layers 16 can be disposed on other parts of the hand and leg that remain relatively straight, i.e. where long straight bones are located.

When the actuators 36 apply mechanical force or controller force to the stack 15 of layers 16 in the wearable device the user can experience different levels of stiffness and resistance. This is because the variable number of layers 16 create controlled locational friction to provide variable resistance or damping. Accordingly, different tasks can attribute to the different stiffness experiences at different locations on the hand and the leg to create the virtual reality, augmented reality and mixed reality settings.

Figure 11:
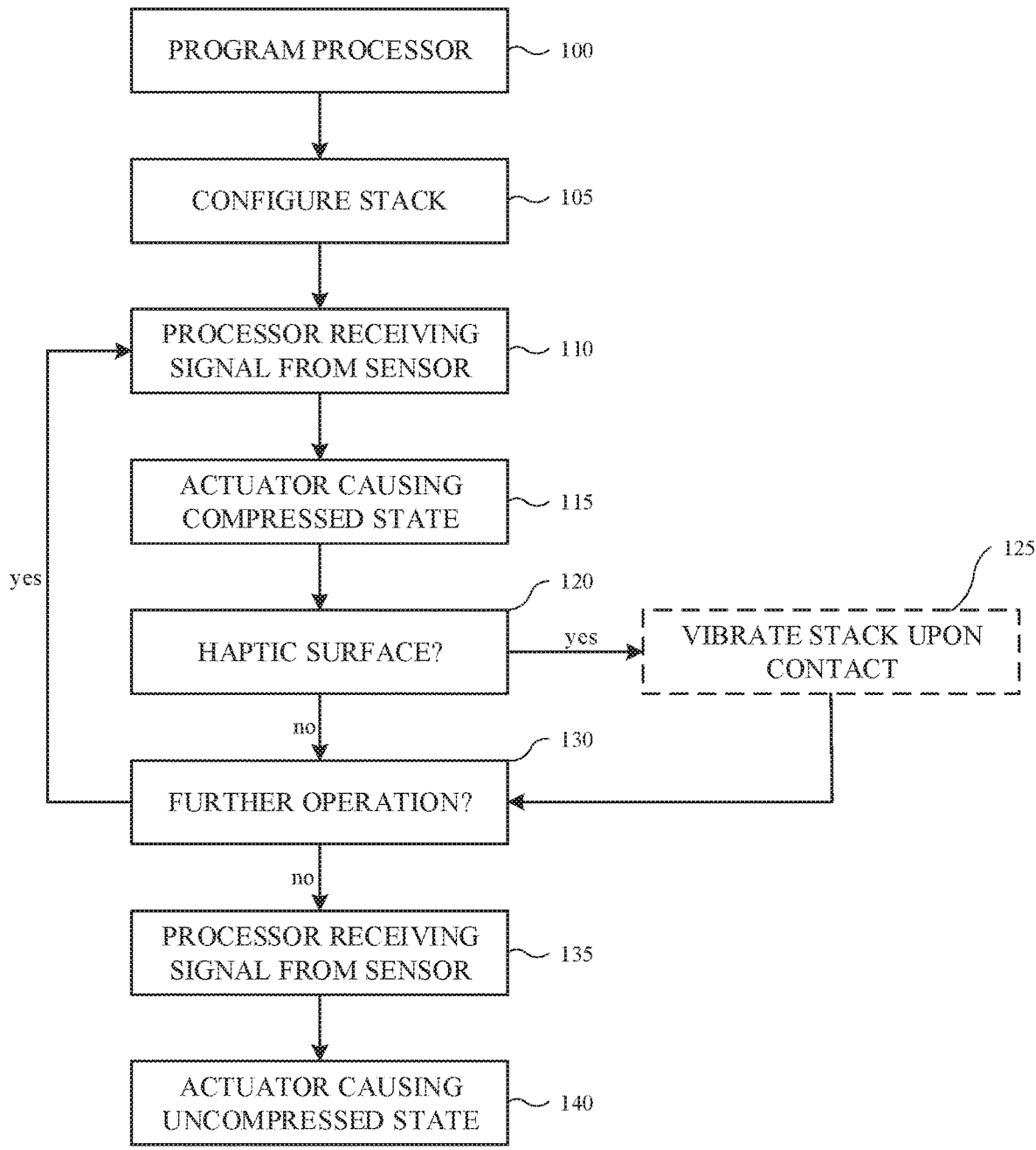
FIG. 11 is a flow diagram of an operation of the stiffness modulator for use with the described embodiments.

FIG. 11 illustrates a flow diagram an operation of the stiffness modulator 10 for use with the described embodiments. In step 100, the processor 70 can be programmed to correlate different levels of mechanical force instructions based on signals from the sensor 66 and stored user preferences 72 in relation to the specified resistance or relative movement of the stack 15 of layers 16. The processor 70 can also be programmed to correlate different shapes of controller force instructions based on signals from the sensor 66 and stored user preferences 72 in relation to the specified shape of the stack 15 of layers 16. Next, in step 105, the stack 15 of interleaved layers 16 can bend or be configured into the specified shape by an external force in the uncompressed state. Alternatively, in haptic surfaces this step is skipped because the stiffness modulator 10 can create the specified shape of the stack 15 of layers 16.

In step 110, the processor 70 can receive a signal from the sensor 66, the button 68 or from a created signal based on the user preferences 72. Subsequently, in step 115, the processor 70 can activate the actuator 36 to release the mechanical force (or the controller force) based on the received signal to the stack 15 of layers 16 in the compressed state. The mechanical force can substantially fix the stack 15 of layers 16 or provide variable levels of mechanical stiffness as described above. This controller force can substantially fix the stack 15 of layers 16 in various shapes as described above.

In step 120, the processor 70 determines if the stack 15 of layers 16 is a surface for providing haptics. If the stack 15 is a surface for providing haptics, the process continues to step 125 where actuator 36 can be activated such as to cause the stack 15 of layers 16 to vibrate, slightly move or sense pressure when programmed to do so by the processor 70. In other words, an external force, such as a haptic force provided by the actuator 36, can cause the stack 15 of layers 16 to provide haptics. This step is optional as haptic surfaces can require this process step but not all stiffness modulator 10 applications require it.

Step 130 requests information from the processor to determine if further operation is desired. If further operation is desired, steps 110-120 can repeat as the stiffness modulator 10 goes back and forth between various compressed states.

In step 135 after the user is done operating the stiffness modulator 10, the processor 70 can receive the signal from the button 68 to activate the uncompressed state in the stiffness modulator 10. Accordingly, in step 140, the processor 70 can activate the actuator 36 to release the mechanical force (null controller force) from the stack 15 of layers 16 in the stiffness modulator 10. Thus, the stiffness modulator 10 is now in the uncompressed state. Accordingly, the stiffness modulator 10 can be folded and stored for later use. This process step can be followed by transitioning the stiffness modulator 10 into the compressed state since the stiffness modulator 10 can be stored in either state.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

An integrated hinge assembly for use with an electronic system is described having at least a first part that carries a display for presenting visual content and a second part that carries an input device that includes, at least, a stack that includes layers of bendable material. The stack has a first end coupled to the first part and a second end, opposite the first end, coupled to the second part. The layers are capable of bending and retaining a continuous and smooth profile in response to an applied force. The stack is capable of transitioning between an uncompressed state having a first thickness and a first resistance to relative movement of the first and second parts and a compressed state having a second thickness and a second resistance to relative movement of the first and second parts. The second thickness is less than the first thickness and the second resistance to relative movement is greater than the first resistance to relative movement.

A personal computing device is described that comprises a single piece body having a seamless overall appearance and that includes a bendable portion that is capable of having a smoothly curved shape. The single piece body includes a first part capable of carrying a display suitable for presenting visual content, and a second part that is capable of carrying an input device suitable for accepting an input action. The personal computing device also includes a multi-state bending assembly carried by the single piece body at the bendable portion and positioned between and in mechanical communication with the first part and the second part. The multi-state bending assembly includes a planar assembly that, in a first state, is characterized as having a first thickness and allows relative movement of the first and second parts with respect to each other. In a second state, the planar assembly is characterized as having a second thickness, less than the first thickness, that is capable of maintaining a fixed angular displacement between the first and second parts.

In one embodiment, the planar assembly further includes an interlayer interposed between each layer of bendable material. In an uncompressed state of the multi-state bending assembly, at least some of the layers are separated by a first separation distance such that a mechanical coupling between the layers establishes a first resistance, and in the compressed state of the multi-state bending assembly, at least some of the layers are separated by a second separation distance such that the mechanical coupling establishes a second resistance. Also, in the uncompressed state, an actuator permits a release of mechanical energy from the planar assembly thereby allowing at least some of the layers to maintain the first separation distance so as to be able to move with respect to each other. In the compressed state, the actuator prevents the release of mechanical energy from the layers thereby allowing at least some of the layers to maintain the second separation distance. In one embodiment, in the uncompressed state, the layers are capable of moving relative to each other, and in the compressed state, the layers are substantially fixed with respect to each other. In one embodiment, the actuator includes at least one of an air pump, a vacuum pump, an electrostatic polymer and an air bladder. In one embodiment, the personal computing device further includes an electronic trace that couples the first and the second parts and that allows passage of electrical signals or information. The single piece body is a laptop-computing device. The first part is a first electronic device having the display, and the second part is a second electronic device having a display capable of presenting visual content in the form of the input device. The first and second electronic devices communicate with each other by way of the electronic trace or a wired connection that is carried by the stack. The first electronic device is a first tablet computer and the second electronic device is a second tablet computer.

In one embodiment, the personal computing device further includes a sensor capable of providing a first signal in accordance with the uncompressed state and a second signal in accordance with the compressed state, and a programmable processor communicating with the sensor and the actuator. The processor is capable of (i) receiving the signals from the sensor, and (ii) causing the actuator to act on the planar assembly in accordance with one of the compressed or uncompressed states.

In one embodiment, the integrated hinge assembly further includes a first part movably coupled to a second part via the stack. The second part substantially covers the first part to deactivate an electronic device.

A portable electronic device is also described that includes a first part that carries a visual display for presenting visual content, a second part that carries an input device, and a solid state hinge assembly coupled to the first and second part in a manner that allows relative angular movement between the first and second parts, wherein the solid state hinge assembly includes a bending medium capable of (i) bending in response to an applied force and (ii) providing a resistance to movement in accordance with an amount of bending, and a force actuator physically coupled to the bending medium, the force actuator capable of providing the force.

In one embodiment, the portable electronic device is a laptop-computing device and wherein the first part is a lid and the second part is a base capable of supporting the lid. The lid further carries a camera assembly and a speaker assembly, and the input device is a keyboard.

In one embodiment, the actuator is capable of providing (i) a first force corresponding to a first angular displacement between the lid and the base, and (ii) a second force corresponding to a second angular displacement between the lid and the base. The first and second angular displacements are different. The first angular displacement corresponds to a first angle suitable for presentation of the visual content, and the second angular displacement corresponds to a second angle that is suitable for use of the keyboard.

Further, a method carried out by operating an adjustable bending structure including a stack of layers is described. The stack of interleaved layers can include material capable of bending in response to an applied force. The adjustable bending structure can be in communication with a sensor capable of detecting a shape of the stack and providing a signal, and can be in communication with an actuator capable of receiving the signal and responding by applying a controller force that controls a shape of the stack. A first controller force can correspond to a first shape and a second controller force can correspond to a second shape. The method includes the actuator receiving a first signal provided by the sensor. The first signal can correspond to the first controller force. Subsequently, the actuator can apply the first controller force to the stack in accordance with the first signal, and the first controller force causes the stack to take on the first shape. Next, the actuator can receive a second signal provided by the sensor. The second signal can correspond to the second controller force. Thereafter, the actuator can apply the second controller force to the stack in accordance with the second signal, and the second controller force causes the stack to take on the second shape that is different than the first shape.

In one embodiment, when the controller force is a null force, the shape corresponds to an uncompressed state. Otherwise, the shape corresponds to a compressed state.

In one embodiment, the method further includes programming a processor to correlate different levels of mechanical force instructions based on other signals from the sensor in relation to the specified shape of the stack, and receiving the other signals from the sensor, and activating the actuator to apply the mechanical force instructions received from the programmed processor based on the received other signals.

In one embodiment, the method further includes bending the stack via raising portions of a surface of the adjustable bending structure to provide a flat keyboard edge definition, activating two or more actuators to substantially fix the raised portion in a compressed state, and vibrating the raised portions of the surface of the adjustable bending structure upon contact.

In one embodiment, the method further includes providing varied number of interleaved layers at different locations of the stack to adjust a relative stiffness and vary an applied resistance to movement. The adjustable bending structure is one of a glove, an elbow sleeve and a knee brace.

As described above, one aspect of the present technology is the gathering and use of data available from various sources to improve the delivery to users of personal content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A personal computing device, comprising:
a single piece body having layers of bendable material, wherein the single piece body includes (i) a first part capable of carrying a display, and (ii) a second part that is capable of carrying an input device; and
a multi-state planar hinge assembly carried by the layers of the bendable material and positioned between and in mechanical communication with the first part and the second part, wherein the multi-state planar hinge assembly includes a planar assembly formed of the layers of bendable material that, in a first state, the planar assembly is characterized as having a first thickness and allows relative movement of the first and second parts with respect to each other, and wherein in a second state, the planar assembly is characterized as having a second thickness less than the first thickness, and capable of maintaining a fixed angular displacement between the first part and the second part.

2. The personal computing device of claim 1, wherein:
the planar assembly includes an interlayer interposed between each of the layers of bendable material;
the first state is an uncompressed state where at least some of the layers of bendable material are separated by a first separation distance such that a mechanical coupling between the layers establishes a first resistance; and
the second state is a compressed state where at least some of the layers of bendable material are separated by a second separation distance such that the mechanical coupling establishes a second resistance.

3. The personal computing device of claim 2, wherein:
in the uncompressed state, an actuator permits a release of mechanical energy from the planar assembly thereby allowing at least some of the layers to maintain the first separation distance; and
in the compressed state, the actuator prevents the release of mechanical energy from the planar assembly.

4. The personal computing device of claim 1, wherein:
in the first state, the layers of the bendable material are capable of moving relative to each other; and
in the second state, the layers of the bendable material are fixed with respect to each other.

5. The personal computing device of claim 1, further comprising an actuator including at least one of an air pump, a vacuum pump, an electrostatic polymer or an air bladder.

6. The personal computing device of claim 1, further comprising:
an electronic trace that couples the first and the second parts.

7. The personal computing device of claim 1, wherein the single piece body is a laptop-computing device.

8. The personal computing device of claim 1, wherein:
the first part is a first electronic device having the display; and
the second part is a second electronic device having the input device.

9. The personal computing device of claim 8, wherein the first and second electronic devices communicate with each other by way of an electronic trace.

10. The personal computing device of claim 9, wherein the first electronic device is a first tablet computer and wherein the second electronic device is a second tablet computer.

11. The personal computing device of claim 1, further comprising:
a sensor capable of providing a first signal in accordance with the first state and a second signal in accordance with the second state;
a processor communicating with the sensor and an actuator, wherein the processor is capable of (i) receiving either the first signal or the second signal from the sensor, and (ii) causing the actuator to act on the planar assembly in accordance with either the first or second states.

12. A portable electronic device, comprising:
a first part that carries a display,
a second part that carries an input device; and
a solid-state hinge assembly coupled to the first part and the second part in a manner that allows relative angular movement between the first part and second part, wherein the solid-state hinge assembly includes:
  a bending medium capable of (i) bending in response to an applied force, and (ii) providing a resistance to movement in accordance with an amount of the bending; and
  a force actuator coupled to the bending medium and located within one of the first part or the second part, the force actuator capable of providing the applied force.

13. The portable electronic device of claim 12, wherein:
the first part is a lid; and
the second part is a base capable of supporting the lid.

14. The portable electronic device as recited in claim 13, wherein:
the lid further carries a camera assembly and a speaker assembly; and
the input device is a keyboard.

15. The portable electronic device as recited in claim 14, wherein the force actuator is capable of providing:
(i) a first force corresponding to a first angular displacement between the lid and the base; and
(ii) a second force corresponding to a second angular displacement between the lid and the base, wherein the first and second angular displacements are different from each other.

16. The portable electronic device as recited in claim 15, wherein:
the first angular displacement corresponds to a first angle suitable for the display presenting visual content; and
the second angular displacement corresponds to a second angle that is suitable for the input device.

17. A method of operating an adjustable bending structure that includes a stack of layers of bendable material capable of bending in response to an applied force, wherein the adjustable bending structure (i) is in communication with a sensor capable of detecting a shape of the stack of layers and providing a signal, and (ii) is in communication with an actuator capable of receiving the signal and responding by applying a controller force that controls the shape of the stack of layers, the method comprising:
receiving, by the actuator, a first signal provided by the sensor, the first signal corresponding to a first controller force;
applying, by the actuator, the first controller force such as to cause the stack of layers to take on a first shape;
receiving, by the actuator, a second signal provided by the sensor, the second signal corresponding to a second controller force; and
applying, by the actuator, the second controller force such as to cause the stack of layers to take on a second shape that is different than the first shape.

18. The method of claim 17, wherein when the controller force is a null force, the shape of the stack of layers corresponds to an uncompressed state, otherwise, the shape of the stack of layers corresponds to a compressed state.

19. The method of claim 17, wherein the first controller force corresponds to the first shape and the second controller force corresponds to the second shape.

20. The method of claim 17, further comprising:
providing varied number of interleaved layers at different locations of the stack of layers to adjust a relative stiffness.

* * * * *